United States Patent

Schlameus et al.

[11] Patent Number: 5,959,073
[45] Date of Patent: Sep. 28, 1999

[54] METHOD FOR PREPARING POLYMERIC BEADS

[75] Inventors: Herman Wade Schlameus; Darren Eugene Barlow, both of San Antonio, Tex.

[73] Assignee: Southwest Research Institute, San Antonio, Tex.

[21] Appl. No.: 08/889,032

[22] Filed: Jul. 7, 1997

[51] Int. Cl.[6] .................................................. C08F 6/12
[52] U.S. Cl. ...................... 528/490; 528/488; 528/491; 528/498; 528/502 R; 525/330.2; 525/369; 521/25; 521/38
[58] Field of Search ..................... 528/488, 491, 528/498, 502 R, 490; 521/25, 38; 525/330.2, 369, 383

[56] References Cited

U.S. PATENT DOCUMENTS

| | | |
|---|---|---|
| 3,043,782 | 7/1962 | Jensen . |
| 3,179,600 | 4/1965 | Brocket . |
| 3,664,963 | 5/1972 | Pasin . |
| 3,692,690 | 9/1972 | Horger . |
| 3,872,024 | 3/1975 | Horger . |
| 4,089,843 | 5/1978 | Rausch, Jr. ............................ 528/498 X |
| 4,110,529 | 8/1978 | Stoy ...................................... 528/498 X |
| 4,268,411 | 5/1981 | Iwata . |
| 4,269,729 | 5/1981 | Maruyama et al. . |
| 4,461,832 | 7/1984 | Tschang et al. . |
| 4,464,317 | 8/1984 | Thies et al. . |
| 4,777,089 | 10/1988 | Takizawa et al. . |
| 4,908,233 | 3/1990 | Takizawa et al. . |
| 5,051,304 | 9/1991 | David et al. . |

OTHER PUBLICATIONS

Hackh's Chem. Dictionary, 4th ed., McGraw–Hill, N.Y., p. 610, 1969.

*Primary Examiner*—Fred Teskin
*Attorney, Agent, or Firm*—John L. Sigalos

[57] ABSTRACT

A method of forming polymer beads comprising forming an aqueous solution comprising a cross-linkable water soluble polymer and a water-soluble crosslinking agent, adding said solution with mixing to a thixotropic oil gel comprising an oil in which said polymer is insoluble and a silica or silicate, continuing said mixing for a time sufficient and under conditions sufficient to form a water-in-oil dispersion having individual water/polymer droplets dispersed in said thixotropic oil gel, stopping mixing, and when the droplets are in the form of solid beads recovering the beads from the thixotropic oil gel.

11 Claims, No Drawings

METHOD FOR PREPARING POLYMERIC BEADS

The present invention was made under Government Contract No. NAG3-1529 with the National Aeronautics & Space Agency.

BACKGROUND OF THE INVENTION

The present invention relates to a method of forming polymer beads useful as ion exchange beads and for drug delivery, food flavorings, and other applications.

At the present time it is difficult to form polymeric beads rapidly and to a desired size, particularly larger sizes; i.e., 750 micrometers, while avoiding agglomeration. Present procedures require continuous mixing during bead formation during which time the beads being formed come into contact and can agglomerate.

Moreover, such continuous mixing in order to avoid agglomeration further often changes the desired particle sizes of the beads that are being formed.

SUMMARY OF THE INVENTION

The present invention overcomes the problems of the prior art and provides a simple method allowing the formation of polymeric beads without agglomeration.

Briefly, the present invention comprises a method of forming copolymer beads comprising forming an aqueous solution of a crosslinkable water-soluble polymer, alone or with one or more other polymers containing functional groups, adding such solution with mixing to a thixotropic oil gel comprising an oil in which said polymers are insoluble and a silica or silicate, continuing said mixing for a time sufficient to form a water and oil dispersion having individual water/polymer droplets of the desired size dispersed in said thixotropic oil gel, stopping mixing, and when the droplets form into solid beads recovering the beads from the thixotropic oil gel.

DETAILED DESCRIPTION

The method comprising first forming a polymer solution and then carrying out the crosslinking reaction to form the beads in a thixotropic oil gel phase.

With respect to the aqueous polymeric solution, the cross-linkable polymer alone or a mixture thereof with at least one polymer containing functional groups and water is formed and, if necessary, a crosslinking agent added to this aqueous solution. A wide variety of polymers can be utilized as discussed below, but it is necessary, of course, that those utilized be soluble in water and that the cross-linkable polymer be capable, when crosslinked, of forming insoluble polymer beads.

The preferred cross-linkable polymer is a polyvinyl alcohol (PVOH). It is preferred to use a fully hydrolyzed PVOH having a viscosity, in a 4% aqueous solution, of about 28.5–32.5 cps and a molecular weight of about 77,000 to 79,000. Other polyvinyl alcohols having different degrees of hydrolysis and molecular weights are utilized as long as they can form into a solid (gel) when they are crosslinked.

It is also possible to utilize in place of or with the polyvinyl alcohol other known water-soluble polymers, including naturally occurring polymers, such as gelatins, albumins, alginates, chitosan, and mixtures thereof, certain of these can be cross-linked by heat alone and do not require the use of cross-linking agents. As used herein, the term "water-soluble polymers" also means and includes water-miscible polymers.

If desired one or more polymers containing functional groups can be mixed with the polyvinyl alcohol. It is preferred to use a polyacrylic acid (PPA), one having a molecular weight of about 60,000, but any polyacrylic acid of any molecular weight is suitable. In addition to a polyacrylic acid, it is possible to use other acrylic polymers such as polymethacrylic acids or any polymer containing functional groups.

The concentration of the respective polymers in the aqueous solution is not critical so long as they are such that drops of the polymers with the crosslinking agent can be formed in the thixotropic oil gel, as hereinafter described. For example, the ratio for the PVOH:PAA can be 1:4 to 4:1, preferably 1:1. This is given by way of example and when other polymers are utilized, the most optimum ratios can be determined by routine experimentation.

With respect to the crosslinking agent for the water-soluble cross-linkable polymer, any conventional one soluble in water can be utilized with glutaraldehyde being a preferred example, and with formaldehyde and glyoxal also being suitable. The crosslinking agent is utilized in the amounts most suitable for crosslinking of the cross-linkable water-soluble polymer(s). The optimum amount for any given combination of polymers can be determined by routine experimentation.

As to the thixotropic oil gel, it is a combination of an oil and silicate; ones that form a thixotropic mix that can support dispersed water/polymer droplets. Examples of suitable oils are mineral oils (liquid petroleum derivatives) and vegetable oils such as cottonseed, linseed, corn, coconut, babassu, olive, tung, and the like. As to the silicate a preferred example is fumed silica preferred example is calcium silica and silicate and other known silicates also being suitable.

Crosslinking of the water-soluble polymer, such as PVOH, is effected by the crosslinker, such as glutaraldehyde, entrapping, if used, the additional polymers, such as PAA.

With the mixture of a polyvinyl alcohol and a polyacrylic acid, for example, it has been found that a suitable combination for the oil gel phase is a mineral oil (about 90 to 94 wt. %) and amorphous fumed silica (correspondingly about 6 to 10 wt. %). The amount of each of the oil and silica used is that sufficient to form a thixotropic gel and can be determined for each given combination of oil and silicate by routine experimentation. The amount of the thixotropic oil gel utilized for the particular amount of the aqueous solution of polymers added thereto is that sufficient to permit thorough dispersion of the solution thereof to form the beads. The optimum amount for each given polymer system can be determined by routine experimentation.

In carrying out the process after the aqueous solution of the polymer(s) and the thixotropic oil gel are formed, it is only necessary to add the aqueous polymeric solution to the gel with mixing.

The mixing is carried out at speeds and for a time sufficient to obtain water/polymer droplets having the size desired for the final beads and disperse them in the thixotropic oil gel. It is thus possible, depending on the speed of mixing and the length of mixing, to have droplets ranging from 1 micrometer or less up to 5 millimeters. With the instant invention it is preferred to have beads that can range in size from 50 to 1500 micrometers.

The crosslinking can be carried out at ambient temperature and pressure, but it is preferred to use slightly elevated temperatures, such as about 50° to 60° C. to expedite the reaction.

After the droplets of the desired size are formed, the mixing is stopped and it is found, depending upon the polymeric material utilized with the crosslinker, that it may take a further period of time for the crosslinking to be completed. An important aspect of the instant invention is that the droplets being substantially uniformly dispersed and suspended in the thixotropic oil phase remain in a separate and individual state and harden into the beads, even if completion of the polymerization takes several hours after the mixing is stopped. The beads do not contact each other and agglomerate before the crosslinking is complete.

The beads are then removed from the oil phase by any conventional technique, as by utilization of the vacuum, and then are dried, as is conventional, by rinsing with a hydrocarbon to remove the oil and air drying. Any residual water present can be extracted with acetone and the results are free flowing beads having the particle size desired.

While the beads can be utilized as such, they can be further reacted if a further polymer containing functional groups has been used with alkaline-earth metal hydroxides to form the salt of the added polymer. Thus, if a polyacrylic acid is utilized, it would be the polyacrylic acid salt. The preferred hydroxide utilized is calcium hydroxide, although in addition to the alkaline-earth metal hydroxides, other alkali materials can be utilized, such as alkali metal hydroxides, e.g. sodium and potassium hydroxides, and the like.

The invention will be furthers described in connection with the following example, which is set forth for purposes of illustration only.

EXAMPLE 1

A polymer solution was formed by admixing 225 g of a 10% by wt. aqueous solution of a fully hydrolyzed polyvinyl alcohol having a molecular weight of 77,000–79,000 and a viscosity of 28.5–32.5 cps, 90 g of a 25% by wt. aqueous solution of polyacrylic acid having a molecular weight of 60,000 and 8.4 g 50% glutaraldehyde.

Separately, a thixotropic gel was formed by admixing a liter of mineral oil and 100 g of amorphous fumed silica.

The polymer solution was added to the thixotropic oil gel with mixing using a laboratory mixer at 500 RPM at 50° C. to form a water-in-oil dispersion with the desired water/polymer droplet size ~500 microns. Mixing was stopped and crosslinking was permitted to continue for approximately 3 hours at the noted temperature.

Because of the thixotropic nature of the oil phase, the water/polymer droplets did not settle or agglomerate. This is an important aspect of this invention as the suspension allows the PVOH to crosslink and entrap the PAA while the beads are separate and individual, even if the crosslinking process takes several hours or longer.

The beads were removed by filtering the materials using a vacuum to remove the oil phase. The beads were rinsed with a hydrocarbon to remove the oil and air dried, yielding free flowing dried beads.

EXAMPLE 2

The method of Example 1 is carried out except that an equivalent amount of polymethacrylic acid is substituted for the polyacrylic acid. Again, free flowing beads are obtained.

EXAMPLES 3 TO 10

The methods of Examples 1 and 2, respectively, are followed except that separately, and in turn, a gelatin, albumin, sodium alginate, and chitosan are substituted in equivalent amounts for the polyvinyl alcohol. In each instance, free flowing beads are obtained.

EXAMPLE 11

The method of Example 1 is carried out except that the thixotropic oil gel therein used is replaced by an equivalent amount of a thixotropic gel of linseed oil and calcium silicate. Free flowing polymer beads are obtained.

The resultant beads formed by the instant invention can be used as ion exchange beads. Further, the resultant beads can be utilized for drug delivery, food flavoring, perfuming, and the like, simply be adding to the aqueous polymer solution, as is conventional, the drug, food flavoring, perfume, and the like desired to be encapsulated in the bead. It will also be evident that other materials can be encapsulated in the beads for a variety of other uses, such as agricultural chemicals; i.e., insecticides, fungicides, herbicides, and the like.

While the invention has been described in connection with a preferred embodiment, it is not intended to limit the scope of the invention to the particular form set forth, but on the contrary, it is intended to cover such alternatives, modification, and equivalents as may be included within the spirit and scope of the invention as defined by the appended claims.

What is claimed is:

1. A method of forming polymer beads comprising forming an aqueous solution comprising a cross-linkable water soluble polymer, adding said solution with mixing to a thixotropic oil gel comprising an oil in which said polymer is insoluble and a silica or silicate, continuing said mixing for a time sufficient and under conditions sufficient to form a water-in-oil dispersion having individual water/polymer droplets dispersed in said thixotropic oil gel, stopping mixing, and when the droplets are in the form of solid beads recovering the beads from the thixotropic oil gel.

2. The method of claim 1 wherein a second polymer containing functional groups is admixed with said aqueous solution.

3. The method of claim 2 wherein a water-soluble cross-linking agent is added to said aqueous solution.

4. The method of claim 3 wherein said cross-linkable water soluble polymer is a polyvinyl alcohol, gelatin, albumin, alginate, chitosan, or mixture thereof.

5. The method of claim 4 wherein said second polymer is a polyacrylic or polymethacrylic acid or a mixture thereof.

6. The method of claim 5 wherein said thixotropic gel consists essentially of a mineral or vegetable oil and fumed silica or calcium silicate in amounts sufficient to form a thixotropic gel.

7. The method of claim 6 wherein the mixing is carried out at speed and for a time sufficient to obtain water/polymer droplets having the size desired for the final beads and to disperse them in said thixotropic gel.

8. The method of claim 7 wherein the thixotropic gel consists essentially of about 90 to 94 wt. % of a mineral oil and, correspondingly 6 to 10 wt. % of amorphous fumed silica.

9. A method of forming polymer beads comprising forming an aqueous solution of polyvinyl alcohol and glutaraldehyde, adding said solution with mixing to a thixotropic oil gel consisting essentially of 90 to 94 wt. % of a mineral oil and, correspondingly, 6 to 10 wt. % amorphous fumed silica, said mixing being carried out at a speed and for a time sufficient to obtain water/polymer droplets having the size desired for the final beads and to disperse them in said thixotropic gel, stopping mixing, and when the droplets are in the form of solid beads recovering the beads from the thixotropic oil gel.

10. The method of claim 9 wherein a second polymer which is a polyacrylic or polymethacrylic acid or a mixture thereof is added to said aqueous solution prior to admixture with said thixotropic oil gel.

11. The method of any one of claim 2 to 8 and 10, including the step of reacting the recovered beads with an alkaline-earth metal hydroxide to form a salt of said second polymer.

* * * * *